INVENTOR
W. G. HALL
BY
ATTORNEY 3,420,959

TELEPHONE CONFERENCE CIRCUIT

William G. Hall, Morris Township, Morris County, N.J., assignor to Bell Telephone Laboratories, Incorporated, New York, N.Y., a corporation of New York Filed Apr. 9, 1965, Ser. No. 447,042
U.S. Cl. 179—18 16 Claims
Int. Cl. H04m 3/56

ABSTRACT OF THE DISCLOSURE

A four-wire time-division multiplex telephone conference circuit is disclosed having a switching arrangement that comprises:

Figure 1:
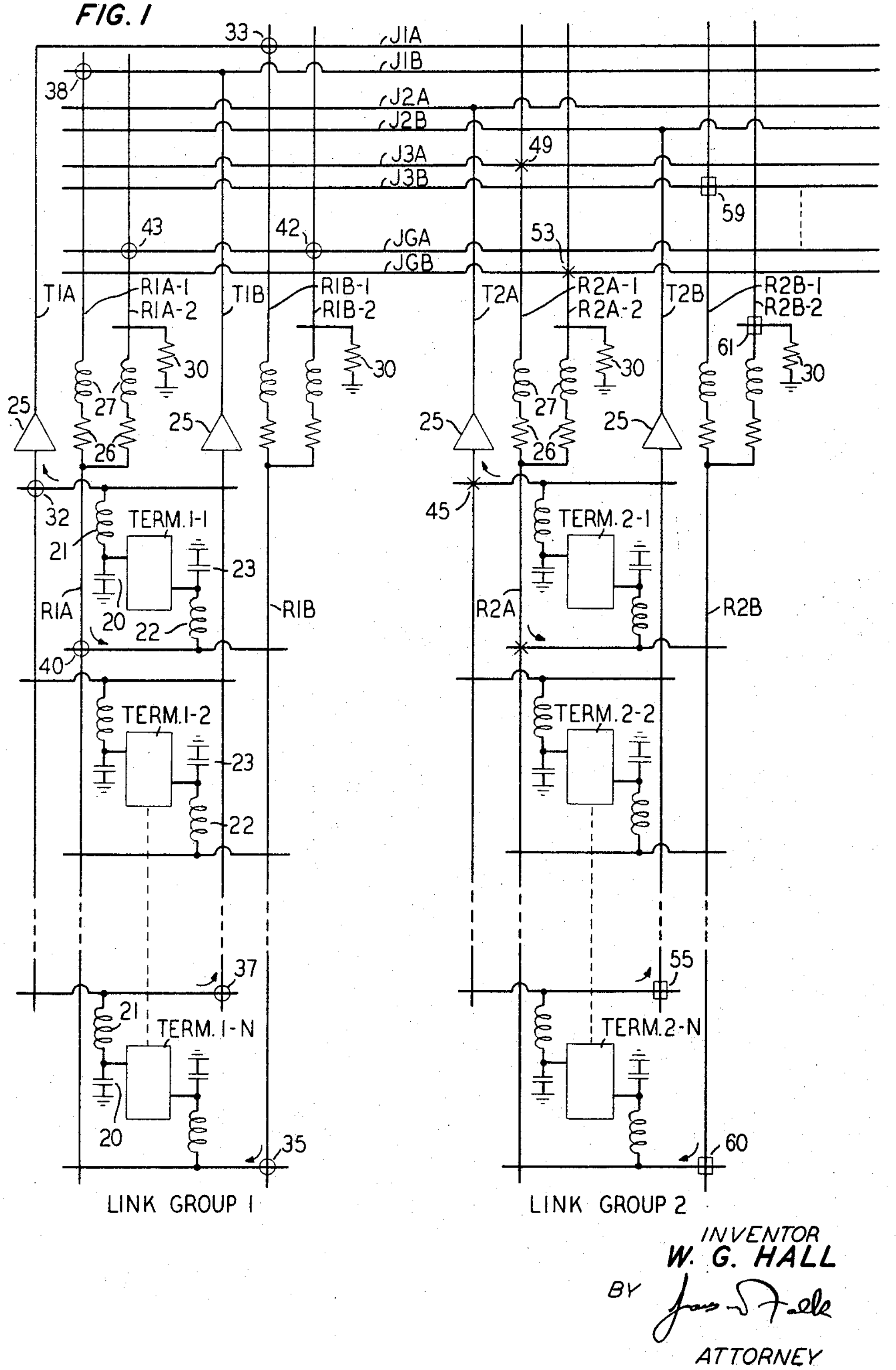

(a) Terminals for processing signals to and from the station equipment;

(b) Links performing common transmission and switching functions for a multiplicity of terminals; and (c) Junctors interconnecting the links into a conference circuit in a time-division switching fashion.

Resonant transfer circuitry is used for linearly combining conference connection pulse amplitude modulated signals and applying combined pulse amplitude modulated signals to conference terminals.

This invention relates to communication circuits and more particularly to conference schemes for four-wire time division switching systems.

In recent years time division switching systems have been given much attention. A typical time division switching system includes a talking bus and a series of line terminals, each terminal being connected through a filter and a gate to the common bus. The system operation is cyclic and each cycle is divided into a series of time slots. To establish a connection between any two line terminals the respective gates are operated together in an assigned time slot in each machine cycle. No other gates are operated in this time slot and a physical connection is established between the two line terminals in the call. The connection is established however only for the duration of the assigned time slot. During this time interval a sample from each line terminal is transferred over the bus to the other line terminal, the exchange typically being by resonant transfer. The filter at each terminal smooths the received speech samples to develop a continuous voice pattern. In most time division switching systems the two-way exchange of samples takes place over a single conductor (bus).

Where the speech samples are delivered in both directions over a single bus, as just described, the system is referred to as a two-wire system. Where a better grade of transmission is required, a different pair of conductors is used for transmit purposes than is used for receive purposes. These systems are referred to as four-wire systems and generally have transmission levels far better than those of comparable two-wire systems.

Both two-wire and four-wire systems are well known in the art. For some purposes a four-wire time division system may be considered substantially the same in operation as a two-wire time division system, with a pair of gates being enabled for each terminal rather than the single bilateral transmission gate of two-wire time division systems.

However, in some aspects four-wire systems present problems that are not resolved merely by doubling the number of gates of a two-wire system. One such problem pertains to establishing conference connections, i.e., connections of three or more parties.

In a two-wire system three lines may be connected through their respective filters and gates to the single bus in the same time slot. The sample from each line is divided equally by the two other lines. Thus each line receives only one half the sample it receives when an ordinary call is established and the transmission loss is approximately 3 db. In most two-wire systems this loss is not serious. But four-wire systems often are used primarily because transmission losses cannot be tolerated, e.g., the lines themselves are long and introduce appreciable losses. Thus in establishing a conference call in a four-wire time division switching system transmission losses must often be avoided. This is difficult however because the sample from each line must be delivered to the other two (or three, etc.). If lossless conferences cannot be established the purpose for using the four-wire system in the first place may be obviated. The obvious expedient is to provide amplification for each line. Needless to say such a scheme is exceedingly costly.

It is a principal object of this invention to provide a relatively inexpensive four-wire time division switching system in which conferences may be established with no transmission losses.

Briefly, in accordance with the principles or my invention the time division switching system includes a series of link groups, each link group having a number of pairs of busses, a transmit bus and a receive bus constituting a pair, or link. A series of junctors is provided for interconnecting the link groups. Each of the line terminals in the system may be connected to all of the transmit and receive bus pairs in a respective link group. To establish an ordinary or conference call each participating line terminal is connected in a common time slot to both the transmit and receive busses of a particular pair in the respective link group. Each of the transmit busses used in the call is connected to one of the junctors. Each of the junctors thus used is connected in that time slot to each of the receive busses used by the other terminals. Thus to establish a three-way conference each line is connected to respective transmit and receive busses. Three junctors are used, each connecting one terminal's transmit bus to the receive busses used by the other two terminals.

Each receive bus in a three-way conference is connected to two junctors since two samples are delivered to each terminal. The effective sample which must be delivered to each receive bus is the sum of the two samples transmitted to it. For this reason each receive bus is connected by a different leg of a summing network to the two connected junctors. The sample delivered to the receive bus is the sum of the two transmitted samples.

Transmission losses are avoided by including an amplifier in each of the transmit busses. It is to be noted that an amplifier is not provided for each line but rather for each link. Thus for example if 50 lines share two links, only two amplifiers are required rather than 50. By placing the amplifiers in the transmit busses transmission losses may be avoided at little increased cost. The connection described above is established in only one time slot of each machine cycle. The three transmit busses used in establishing the call are used by other terminals in other time slots. Thus all of the required amplification is achieved by the inclusion of amplifiers in only transmit busses rather than in each of the individual lines.

Features of this invention include a four-wire time division switching system the provision of a plurality of link groups, each link including a pair of transmit and receive busses, a plurality of junctors each for connecting a transmit bus to one or more receive busses, an amplifier in each transmit bus, and a multileg summing network for connecting one or more junctors to each receive bus.

Figure 2:
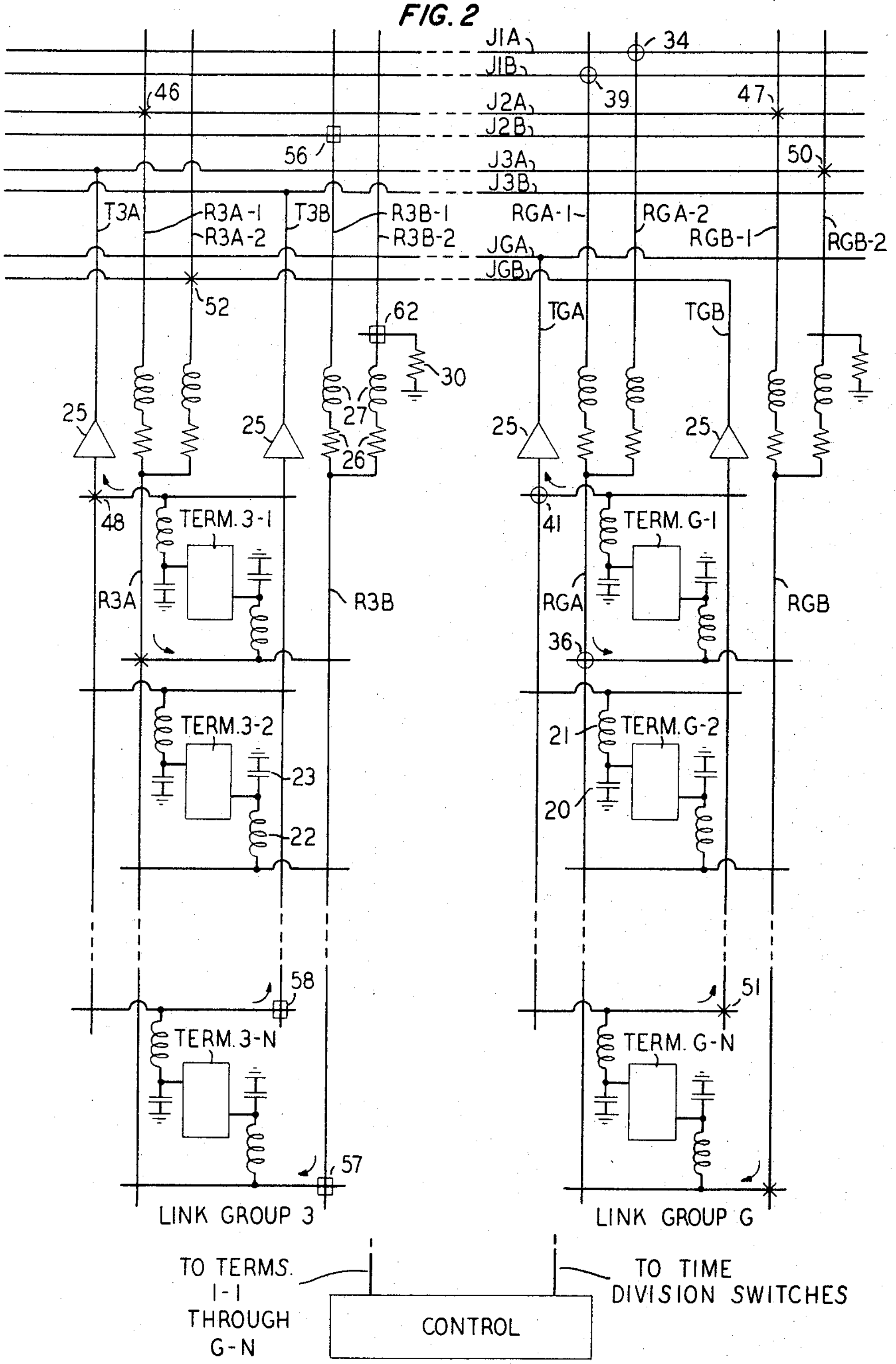
Figure 3:
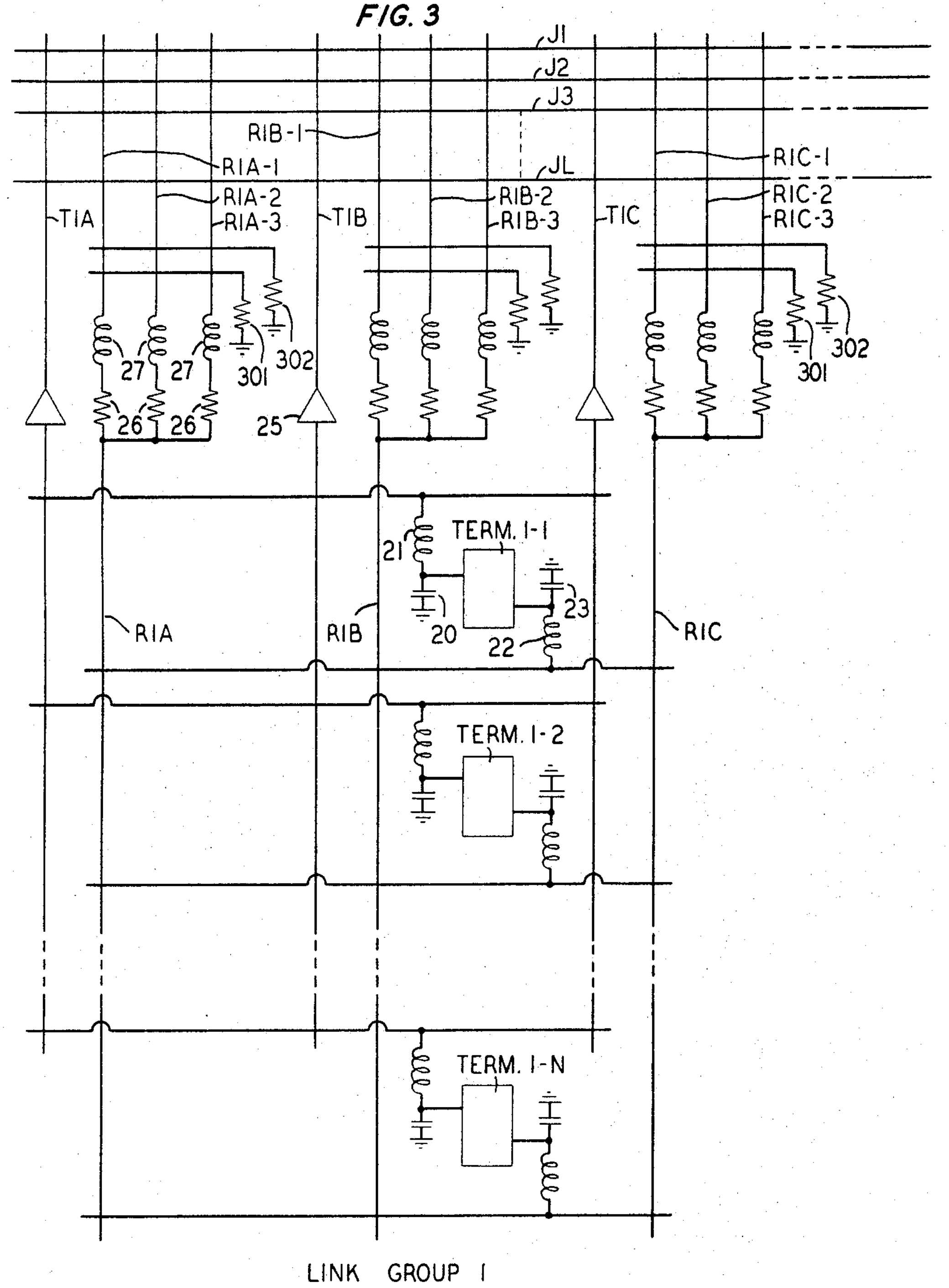
Figure 4:
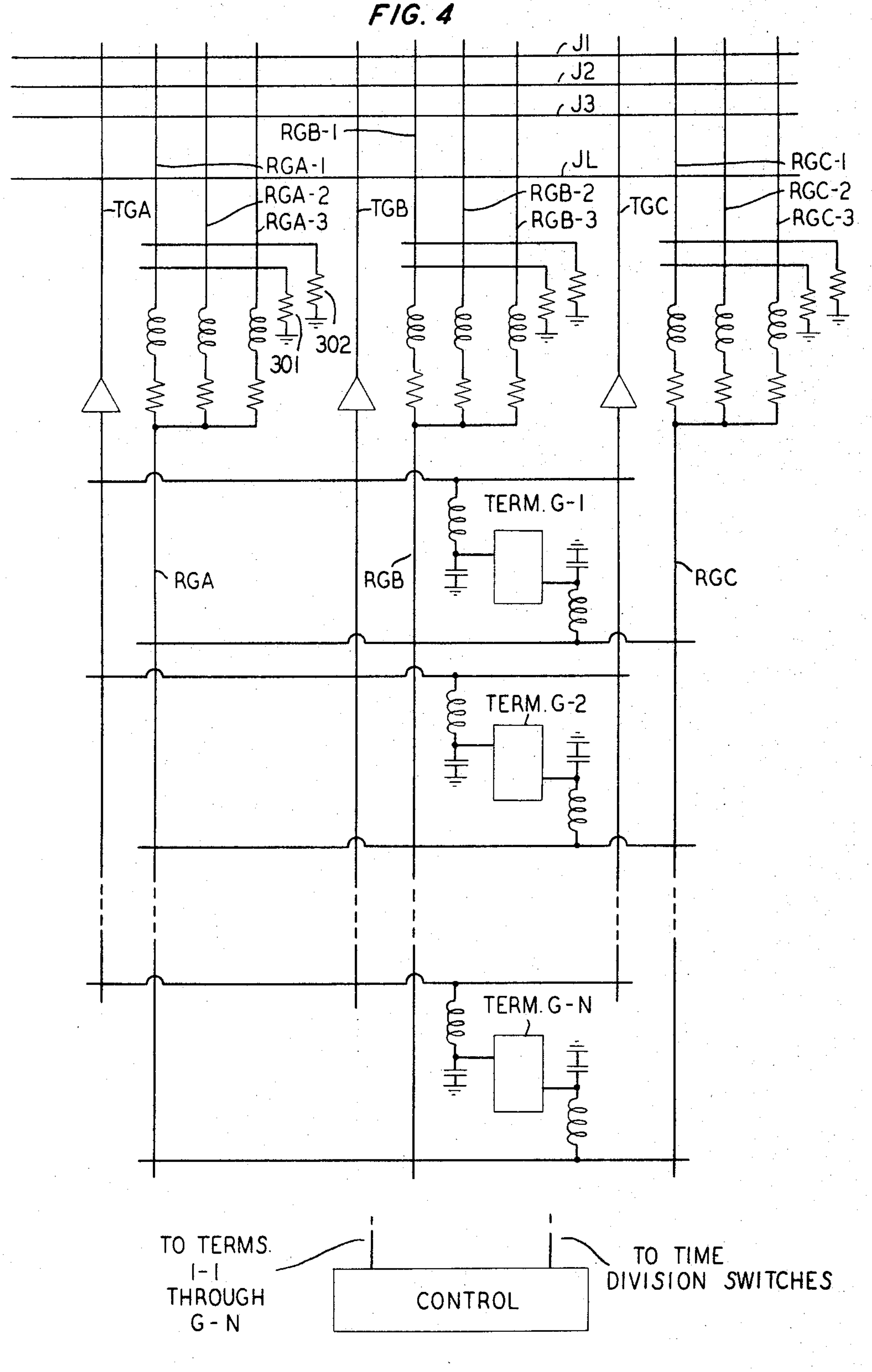

Further objects, features and advantages of the invention will become apparent upon consideration of the following detailed description in conjunction with the drawings in which:

FIGS. 1 and 2, with FIG. 1 to the left of FIG. 2, show a first illustrative embodiment of my invention; and FIGS. 3 and 4, with FIG. 3 to the left of FIG. 4, show a second illustrative embodiment of my invention.

Before proceeding with a description of the operation of the system of FIGS. 1 and 2 it is necesary that the symbology used in the drawing be clearly understood. The junctors are the horizontal lines at the top of the two figures. The various transmit and receive busses are the vertical lines, each receive bus dividing into two legs which intersect the junctors. The circles, X's and boxes at certain of the crosspoints will be described below when illustrative calls are explained; for the moment they may be ignored. Physical connections of various conductors are shown by solder points. Time division gates are shown by crosspoints, i.e., the intersections of straight horizontal and vertical lines. Ordinarily each of the time division crosspoints is open and the respective vertical and horizontal conductors are not connected to each other. A gate is included at each crosspoint for establishing a physical connection in any time slot. The same gate may be operated in more than one time slot in each cycle. It must be borne in mind that each intersection of a vertical and horizontal line without a solder point represents a gate, and not a permanent physical connection.

Each link group is associated with N terminals. These terminals typically may communicate with telephone lines, and include the supervisory and signaling circuits required for telephony, and wave filters appropriate to the sampling and reconstituting processes germane to time-division switching, none of which is shown explicitly. Each terminal is connected at the top left corner to the junction of a respective capacitor 20 and inductor 21. The sample from the terminal, to be transmitted to other terminals, is stored in capacitor 20 and in the assigned time slot is delivered to a transmit bus and through a junctor to the receive busses connected to these other terminals. Another inductor 22 and capacitor 23 are provided for each terminal at the lower right corner. Each of these inductor-capacitor networks is connectable to a receive bus and the samples delivered from other lines are stored in a capacitor 23 and smoothed by it in association with the wave filter in the terminal. The lower right conductor entering each terminal is thus the one over which a signal waveform is received and the upper left conductor exiting each terminal is the one over which a signal waveform is transmitted. Thus it is to be noted that each terminal includes separate transmit and receive networks. The system operation is governed by a control circuit shown only symbolically in FIG. 2. Two types of connections to the control circuits are required. A connection to each of the terminals 1—1 through G–N is provided for supervisory purposes. In this manner the control for example may determine service requests. A connection is also provided from the control to each of the time division gates represented in the drawing by crosspoints for the purpose of operating the various gates in the required time slots. The details of the control circuit are not required for an understanding of the present invention. Numerous time division switching system control circuits are known in the art and it will be apparent to those skilled in the art that by utilizing prior art circuits the various crosspoints in the switching network may be operated in the proper time slots to establish the desired calls. This invention is directed primarily to the switching system and for this reason the terminals and the control circuit as well as the connections between them are shown only symbolically for the purpose of clarity.

Each link group includes two pairs of transmit and receive busses. For example link group 1 includes transmit busses T1A and T1B, and receives busses R1A and R1B. The transmit capacitor 20 and inductor 21 of each of the terminals 1—1 through 1–N may be connected to only the transmit busses. The receive capacitor 23 and inductor 22 of each terminal may be connected to only the two receive busses. If a particular terminal is to be included in a call it is connected to either bus pair T1A and R1A or bus pair T1B and R1B in a particular time slot.

Each of the receive busses branches into two legs. For example legs R1A–1 and R1A–2 are connected to receive bus R1A. The two legs of each receive bus, rather than the receive bus itself, are coupled to the junctors by way of the time division gates. Since each receive bus is provided with only two legs each receive bus can be connected to at most two junctors, i.e., samples from at most two other transmit busses may be extended to each receive bus. Thus in the system of FIGS. 1 and 2 a three-way conference may be established but more than three parties may not be connected together.

Each transmit bus is physically connected to one of the junctors. For example, transmit bus T1A is physically connected to junctor J1A, and transmit bus T1B is physically connected to junctor J1B. Thus no time division gate need be operated to connect a transmit bus to a junctor. Gates must be operated however to connect any one of the junctors to one of the two branches of a receive bus. It should be noted that there are no time division crosspoints provided at the intersections of junctors and the receive bus branches of the respective transmit and receive bus pair. For example, junctor J1B can be connected through a time division gate to every receive bus except bus R1B. Junctor JGA can be connected to every receive bus exept bus RGA. Unless sidetone is desired there is no reason to feed a sample back to the terminal from which it was taken. It should also be noted that junctors may only be connected to receive busses. Each junctor is associated with and physically connected to a transmit bus and the sample transmitted on the junctor must be delivered only to receive busses of other links An amplifier 25 is included in each transmit bus. The amplifier 25 is shared by all of the terminal units which use the bus in the different time slots in a machine cycle. In this manner the two amplifiers in the two transmit busses of each link group do the same job that would be required of individual amplifiers associated with each of the respective terminal units. The amplification is required because each sample may be delivered to two receive busses rather than only one, and by amplifying the signal transmission losses are avoided. The same amplifiers can compensate by appropriately increased gain for additional transmission losses unrelated to the conference function, such as losses in the time-division gates and the terminal filters. Two samples are delivered to each receive bus by way of a resonant transfer summing network. Each receive bus branches into two legs each comprising a series combination of resistor 26 and inductor 27. Inductors 27, together with inductor 21 for each terminal, provide the required inductance for resonant transfer operation while resistors 26 are provided, in accordance with an aspect of my invention, as decoupling resistors to suppress unwanted modes of transfer which may arise because the time-division gates are bilateral.

Two samples are thus delivered to each receive bus, a sample being applied to the upper end of each inductor 27. The samples are added together in each time slot and are transferred to the inductor-capacitor terminal receive network connected to the receive bus through an operated time division switch. The summing network itself is described in James et al. Patent 3,023,278, issued Feb. 27, 1962, except for its specification of a series resistor in only one of the branches corresponding to the –1 and –2 branches of each receive bus in my FIGS. 1 and 2. The symmetrical provision of such resistors distinguishes the summing network used in my invention, in which they suppress undesired modes of resonant transfer which otherwise would degrade transmission in conference connections. Methods of selecting values of resistance and amplifier characteristics appropriate for this end are well known to those skilled in the art. With appropriate components, the transfer is one-way. The two samples on two junctors are transmitted through respective legs of a receive bus, and the sum is delivered to the storage capacitor 23 connected to the receive network of the connected terminal unit.

It will be noted that the –2 branch of each receive bus is provided with an additional time division switch for connecting the branch through a respective resistor 30 to ground. In the event a two-party call is to be established only the –1 branch of each receive bus is connected to a junctor, the junctor being connected to the transmit bus used by the other part in the call. The resonant transfer circuit however is designed to receive samples from two junctors and if a sample is applied to only one branch it will not be delivered intact to the receive network of the terminal unit connected to the respective receive bus. For this reason the –2 branch of the receive bus is connected through resistor 30 to ground. The magnitude of resistor 30 is the same as the impedance seen looking into a junctor from a branch of the receive bus. Thus both branches of the receive bus are terminated properly. The sample applied to the –2 bus is zero because the connected resistor is returned to ground. Since the sample delivered to the –2 bus is zero the only sample received by the terminal unit connected to the receive bus is that applied to the –1 branch.

In FIGS. 1 and 2 the connections required for three calls are shown. The gates which are operated for each call are shown respectively by circles, X's and boxes, as identified below. All gates represented by these three symbols are assumed operated in the same time slot since, in systems in accordance with my invention, the same time slot may be assigned to multiple simultaneous calls. The first conference is between terminal units 1—1, 1–N and G–1. The transmit network of terminal 1—1 is connected to transmit bus T1A, by operated gate 32. The sample supplied by the terminal unit is thus transmitted (as shown by the arrow) through amplifier 25 to transmit bus T1A and junctor J1A. Junctor J1A is connected to receive bus branches R1B–1 and RGA–2 by gates 33 and 34, respectively. The receive network of terminal 1–N is connected to bus R1B by gate 35 and thus the sample transmitted from terminal 1—1 is delivered to terminal 1–N. Receive bus RGA is connected to terminal G–1 by gate 36 and thus the same sample is delivered to the third party in the conference. The transmit network of terminal 1–N is connected by gate 37 and through an amplifier 25 to transmit bus T1B. Junctor J1B is connected by gates 38 and 39, respectively, to receive bus branches R1A–1 and RGA–1. Thus the sample transmitted from terminal 1–N is delivered to receive bus R1A which is connected by gate 40 to the receive network of terminal 1—1. The same sample is also delivered to receive bus RGA and thus terminal G–1 receives samples from the second of the other two terminals in the conference. Finally, the transmit network of terminal G–1 is connected by gate 41 through an amplifier 25 to transmit bus TGA. Junctor JGA is connected by gates 42 and 43, respectively, to receive bus branches R1B–2 and R1A–2. Thus the sample from terminal G–1 is delivered to the receive busses used by the other two terminals. In all, 12 crosspoints or time division gates are operated to establish the three-way call.

It should be noted that in the conference just described two of the terminals are in the same link group, group 1. A three-way conference may also be established between terminals in three different link groups. The gate closures represented by X's in FIGS. 1 and 2 enable a conference to be established between terminals 2–1, 3–1 and G–N. A sample is transmitted from terminal 2–1 to transmit bus T2A via gate 45. Junctor J2A is connected, via gates 46 and 47, to receive bus branches R3A–1 and RGB–1, each of these branches being a leg of the receive bus used by one of the other two terminals. A sample is transmitted from terminal 3–1 via gate 48 to transmit bus T3A and junctor J3A. The sample is in turn transmitted to receive bus branches R2A–1 and RGB–2, via gates 49 and 50. Finally, transmit bus TGB is connected via gate 51 to terminal G–N, and a junctor JGB is connected to receive bus branches R3A–2 and R2A–2, via gates 52 and 53.

A two-party call may also be established in the same time slot, e.g., between terminals 2–N and 3–N utilizing gates 55–62 indicated as boxes in FIGS. 1 and 2. The sample delivered by terminal 2–N is transmitted by gate 55 over transmit bus T2B, junctor J2B and gate 56 to receive bus branch R3B–1, receive bus R3B being connected by gate 57 to terminal 3–N. The sample from this terminal is transmitted by gate 58 over bus T3B, junctor J3B, and gate 59 to receive bus branch R2B–1 and by gate 60 to terminal 2–N. Both receive busses R2B and R3B have only one sample delivered to them. Thus branches R2B–2 and R3B–2 are connected by gates 61 and 62 through the respective resistors 30 to ground.

In FIGS. 1 and 2 the connections described above enable three calls to be established in one time slot. Other calls may be established in the same time slot. However, none of the terminals in groups 1, 2, 3 and G may be included in these calls. Each of the four link groups shown in the drawing have both of the respective transmit and receive bus pairs in use in the selected time slot. Thus the only other connections possible in the same time slot are between terminals in link group 4 through link group G–1, not shown in the drawing.

FIGS. 3 and 4 shows a second illustrative embodiment of the invention. The switching system is similar to that of FIGS. 1 and 2 with four major differences.

The first difference is that each link group is provided with three transmit-receive bus pairs, rather than two. Each terminal may be connected to any of three respective bus pairs. The additional link in each group allows three terminals in the group to be connected to other terminals in the same time slot, rather than only two.

The second difference is that each receive bus divides into three branches rather than two. Since three samples can now be delivered to each receive bus a four-party conference may be established. Four junctors are required, each for connecting one of the four transmit busses used to three receive busses. There is no inherent relationship between the extra link in each group and the extra branch in each receive bus. A two-link group system may be provided as in FIGS. 1 and 2 with each receive bus having three branches as in FIGS. 3 and 4. Similarly, each of the receive busses in FIGS. 3 and 4 may have only two branches rather than three. The purpose for increasing the number of links in each group is to allow additional terminals to be connected to other terminals in the same time slot. The purpose for increasing the number of branches in each receive bus is to enable a greater number of terminals to be connected together in conference.

The third difference is that the resistors used for terminating idle receive bus branches can be connected to any receive bus branch in each group of three, rather than to only one particular branch as in FIGS. 1 and 2. Two resistors are required for each receive bus because if a two-party call is to be established two of the branches in each group of three must be connected through resistances to ground. In FIGS. 1 and 2 only one resistance for each receive bus is required since each receive bus has only two branches. The resistor 30 is connectable to only the –2 branch in each group of two, and the –1 branch is used whenever a two-party call is established. In FIGS. 3 and 4 any one of the three branches connected to a receive bus may be used in a two-party call and any two branches may be used in a three-party call because the resistors 301 and 302 may be connected to any of the branches.

The fourth difference is that in the system of FIGS. 3 and 4 the junctors J1–JL are not physically associated with respective transmit busses· Any transmit bus may be connected to any junctor and thus crosspoints are provided between each junctor and each transmit bus. Similarly, since any transmit bus can be connected to each junctor, each junctor is connectable to all receive busses unlike the system of FIGS. 1 and 2 in which each junctor is not connectable to the receive bus associated with the transmit bus physically connected to the junctor. The more flexible switching system of FIGS. 3 and 4 may be required if the number of links exceeds the numbers of junctors. The system of FIGS. 1 and 2 is "nonblocking" with respect to its junctors. It includes 2G transmit busses and thus at most 2G terminals may be interconnected in any one time slot, since each terminal must be connected to an individual transmit bus. Since 2G junctors are provided there are sufficient junctors to extend all of the 2G transmit busses to other links. In the system of FIGS. 3 and 4 there are 3G transmit busses· But it is not possible to interconnect 3G terminals if the number of junctors, L, is less than 3G. Unless L is equal to 3G there are an insufficient number of junctors to extend each transmit bus to the various receive busses. For this reason only L terminals may be interconnected in the same time slot since at most L transmit busses may be connected to junctors. The system of FIGS. 3 and 4 is "blocking" if 3G is greater than L because while the number of transmit busses allows 3G terminals to be interconnected in any one time slot the number of junctors reduces the maximum number of possible connections. In the system of FIGS. 1 and 2 since the switching network is non-blocking each transmit bus may be physically associated with a respective junctor. But in a blocking system greater flexibility is required because there are fewer junctors than transmit busses. For this reason time division gates are provided to connect each junctor to all transmit and receive busses.

Although the invention has been described with respect to two particular embodiments other arrangements are possible. For example, even in the system of FIGS. 1 and 2 it is not necessary to use the transmit and receive busses in one link for a particular terminal. It is possible to use the transmit but of one link and the receive bus of another link in the same group to establish a connection to a particular terminal. Thus, it is to be understood that numerous modifications may be made in the illustrative embodiments of the invention and other arrangements may be devised without departing from the spirit and scope of the invention.

What is claimed is:

1. A conference circuit for a time-division switching system comprising a plurality of groups of links, each of said links including a transmit bus and a respective receive bus; a plurality of junctors; a plurality of terminals associated with each of said link groups, each of said terminals being selectively connectable to the transmit and receive busses in each of the respective links; amplifying means included in each of said transmit busses; a resonant transfer summing network connected to each of said receive busses and selectively connectable to said junctors; and means for establishing a conference between a selected group of said terminals, said last-mentioned means establishing a connection of each of the terminals in said conference to a pair of selected transmit and receive busses in the respective link group and connection of a junction between each of said selected transmit busses and the summing networks connected to all of the receive busses in the other selected pairs.

2. A conference circuit in accordance with claim 1 wherein each of said transmit busses is physically connected to a respective one of said junctors and each of said junctors is selectively connectable to only the summing networks connected to all of the receive busses except the received bus paired with the transmit bus physically connected to the junctor.

3. A conference circuit in accordance with claim 1 wherein each of said resonant transfer summing networks includes a plurality of inductors each connected to the respective receive bus and selectively connectable to said junctors and further including a plurality of resistances each selectively connectable to an inductor which is not connected to a junctor when one or more of the other inductors in the same summing network are connected to respective ones of said junctors.

4. A conference circuit in accordance with claim 3 further including a resistor connected in series with each of said inductors.

5. A conference circuit in accordance wih claim 1 wherein each of the connections is by way of a time-division gate and each of said terminals is selectively connectable to a transmit bus by way of a first time-division gate and is selectively connectable to the receive bus in the same link by way of a second time-division gate.

6. A time-division switching system comprising a plurality of links, each of said links including paired transmit and receive busses; a plurality of junctors; a plurality of terminals each selectively connectable to respective transmit and receive busses; and means for establishing a conference call for a selected group of said terminals, said means including means for establishing a connection between each of said terminals of said selected group and a respective pair of said transmit and receive busses and a connection of one of said junctors betwen one of said respective transmit busses and all of the receive busses connected to the other terminals in said selected group and means external to said selected terminals for combining pulse amplitude modulated signals and for applying said combined pulse amplitude modulated signals to said selected terminals.

7. A time-division switching system in accordance with claim 6 further including amplifying means connected to each of said transmit busses for amplifying signals transmitted from a connected terminal to a connected junctor.

8. A time-division switching system comprising a plurality of links, each of said links including a transmit and receive bus pair; a plurality of junctors; a plurality of terminals each selectively connectable to respective transmit and receive busses; and means for establishing a call between a selected group of said terminals, said means establishing a connection between each of the terminals in said call and a respective pair of transmit and receive busses and a connection of a junctor between each of said respective transmit busses and all of the receive busses connected to the other terminals in the call; and a summing network connected to each of said receive busses and selectively connectable to said junctors for adding the signals on all junctors connected to the respective receive bus.

9. A time-division switching system comprising a plurality of links, each of said links including a transmit and receive bus pair; a plurality of junctors; a plurality of terminals each selectively connectable to respective transmit and receive busses; and means for establishing a call between a selected group of said terminals, said means establishing a connection between each of the terminals in said call for a respective pair of transmit and receive busses and a connection of a junctor between each of said respective transmit busses and all of the receive busses connected to the other terminals in the call, wherein each of said transmit busses is physically connected to a respective one of said junctors and each of said junctors is selectively connectable to all of the receive busses except the receive bus paired with the transmit bus physically connected to the junctor.

10. A time-division switching system comprising a plurality of terminals, each of said terminals including transmit and receive networks; a plurality of junctors; and means for establishing a call between two or more terminals, said means including means for connecting the transmit network of each of said terminals to one of said junctors and means for connecting each junctor connected to a transmit network to the receive network of all other terminals in the call and a summing network connected between the receive network of each terminal in the call and all of the junctors used in the call except the junctor connected to the transmit network of the same terminal for adding the signals on said junctors and applying the sum signal to the connected receive network.

11. A time-division switching system in accordance with claim 10 further including an amplifier connected between the transmit network of each terminal in the call and the connected junctor.

12. A time-division switching connection comprising a plurality of terminals, each of said terminals having transmit and receive networks; a plurality of summing networks each having a group of input conductors and a single output conductor, the output conductor of each of said summing networks being connected to the receive network of a respective one of said terminals; and means for connecting the transmit network of each of said terminals to an input conductor of each summing network whose output conductor is connected to the receive network of one of the other terminals.

13. A time-division switching connect ion in accordance with claim 12 further including amplifying means in each of said transmit networks and wherein said connecting means is operative to effect a resonant transfer of energy between each of said transmit networks and the receive networks of all of the connected terminals.

14. A time-division switching connection in accordance with claim 13 wherein each of said summing networks contains suppressor means to inhibit disadvantageous modes of resonance in said resonant transfer of energy.

15. A time-division switching connection comprising a plurality of terminals, means for cyclically transmitting a signal sample from each of said terminals to a plurality of others of said terminals, and means including resonant transfer circuitry connected to each of said terminals for linearly combining all of the received signal samples.

16. A time-division switching connection in accordance with claim 15 further including means for amplifying all of the signal samples transmitted from said terminals.

References Cited

UNITED STATES PATENTS 3,274,342 9/1966 Brightman ---------- 179—18

KATHLEEN H. CLAFFY, *Primary Examiner.*

A. H. GESS, *Assistant Examiner.*

U. S. Cl. X.R.

179—15

UNITED STATES PATENT OFFICE

CERTIFICATE OF CORRECTION

Patent No. 3,420,959 January 7, 1969

William G. Hall

It is certified that error appears in the above identified patent and that said Letters Patent are hereby corrected as shown below:

Column 8, line 62, "for" should read -- and --; line 74, after "more" insert -- of said --.

Signed and sealed this 16th day of December 1969.

(SEAL)
Attest:

Edward M. Fletcher, Jr.
Attesting Officer

WILLIAM E. SCHUYLER, JR.
Commissioner of Patents